United States Patent
Nijim

(10) Patent No.: US 8,364,013 B2
(45) Date of Patent: Jan. 29, 2013

(54) CONTENT BOOKMARKING

(75) Inventor: Yousef Wasef Nijim, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 179 days.

(21) Appl. No.: 12/868,838

(22) Filed: Aug. 26, 2010

(65) Prior Publication Data

US 2012/0051717 A1  Mar. 1, 2012

(51) Int. Cl.
H04N 9/80 (2006.01)
(52) U.S. Cl. .................................. 386/239; 386/241
(58) Field of Classification Search ............... 386/241, 386/239, 248, 343, 344, 345, 347
See application file for complete search history.

(56) References Cited

U.S. PATENT DOCUMENTS

| | | | |
|---|---|---|---|
| 5,565,909 A | 10/1996 | Thibadeau et al. |
| 5,808,662 A | 9/1998 | Kinney et al. |
| 5,812,123 A | 9/1998 | Rowe et al. |
| 5,818,439 A | 10/1998 | Nagasaka et al. |
| 5,861,906 A | 1/1999 | Dunn et al. |
| 6,144,375 A | 11/2000 | Jain et al. |
| 6,188,398 B1 | 2/2001 | Collins-Rector et al. |
| 6,282,713 B1 | 8/2001 | Kitsukawa et al. |
| 6,438,579 B1 | 8/2002 | Hosken |
| 6,615,248 B1 | 9/2003 | Smith |
| 6,934,963 B1 | 8/2005 | Reynolds et al. |
| 6,983,426 B1 | 1/2006 | Kobayashi et al. |
| 7,017,173 B1 | 3/2006 | Armstrong et al. |
| 7,080,139 B1 | 7/2006 | Briggs et al. |
| 7,228,305 B1 | 6/2007 | Eyal et al. |
| 7,246,367 B2 | 7/2007 | Livonen |
| 7,249,366 B1 | 7/2007 | Flavin |
| 7,272,844 B1 | 9/2007 | Bankers et al. |
| 7,363,644 B2 | 4/2008 | Wugofski |
| 7,584,214 B2 | 9/2009 | Narahara et al. |
| 7,596,761 B2 | 9/2009 | Lemay et al. |
| 7,669,219 B2 | 2/2010 | Scott, III |
| 7,673,315 B1 | 3/2010 | Wong et al. |
| 7,698,263 B2 | 4/2010 | Pickelsimer et al. |
| 7,716,376 B1 | 5/2010 | Price et al. |
| 7,895,625 B1 | 2/2011 | Bryan et al. |
| 7,904,924 B1 | 3/2011 | de Heer et al. |
| 7,933,789 B2 | 4/2011 | Boland et al. |
| 7,992,163 B1 | 8/2011 | Jerding et al. |
| 8,090,606 B2 | 1/2012 | Svedsen |
| 8,091,032 B2 | 1/2012 | Fischer |
| 2001/0001160 A1 | 5/2001 | Shoff et al. |
| 2001/0037367 A1 | 11/2001 | Iyer |

(Continued)

FOREIGN PATENT DOCUMENTS

JP  2002-218428  8/2002

OTHER PUBLICATIONS

U.S. Final Office Action dated Dec. 22, 2010 cited in U.S. Appl. No. 11/651,140.

(Continued)

*Primary Examiner* — Robert Chevalier
(74) *Attorney, Agent, or Firm* — Merchant & Gould

(57) ABSTRACT

Content bookmarking may be provided. First, a content program may be displayed and a user initiated input may be received. Next, in response to the user initiated input, a currently displayed point in the content program may be jumped from to a time stamped point in the content program. The content program may then be displayed from the time stamped point.

20 Claims, 3 Drawing Sheets

U.S. PATENT DOCUMENTS

| | | | |
|---|---|---|---|
| 2002/0007485 A1 | 1/2002 | Rodriguez et al. |
| 2002/0056123 A1 | 5/2002 | Liwerant et al. |
| 2002/0087982 A1 | 7/2002 | Stuart |
| 2002/0120757 A1 | 8/2002 | Sutherland et al. |
| 2002/0124252 A1 | 9/2002 | Schaefer et al. |
| 2002/0128831 A1 | 9/2002 | Ju et al. |
| 2002/0144273 A1 | 10/2002 | Reto |
| 2002/0174430 A1 | 11/2002 | Ellis et al. |
| 2002/0194195 A1 | 12/2002 | Fenton et al. |
| 2002/0199188 A1 | 12/2002 | Sie et al. |
| 2003/0002849 A1 | 1/2003 | Lord |
| 2003/0021582 A1 | 1/2003 | Sawada |
| 2003/0084449 A1 | 5/2003 | Chane et al. |
| 2003/0093790 A1 | 5/2003 | Logan et al. |
| 2003/0112467 A1 | 6/2003 | McCollum et al. |
| 2003/0115592 A1 | 6/2003 | Johnson |
| 2003/0154477 A1 | 8/2003 | Hassell et al. |
| 2003/0156827 A1 | 8/2003 | Janevski |
| 2003/0177497 A1 | 9/2003 | Macrae et al. |
| 2003/0206710 A1 | 11/2003 | Ferman et al. |
| 2003/0208763 A1 | 11/2003 | McElhatten et al. |
| 2003/0225846 A1 | 12/2003 | Heikes et al. |
| 2004/0034867 A1 | 2/2004 | Rashkovskiy et al. |
| 2004/0060063 A1 | 3/2004 | Russ et al. |
| 2004/0078807 A1 | 4/2004 | Fries et al. |
| 2004/0103167 A1 | 5/2004 | Grooters et al. |
| 2004/0117786 A1 | 6/2004 | Kellerman et al. |
| 2004/0255336 A1 | 12/2004 | Logan et al. |
| 2004/0268386 A1 | 12/2004 | Logan et al. |
| 2005/0022241 A1 | 1/2005 | Griggs |
| 2005/0028208 A1 | 2/2005 | Ellis et al. |
| 2005/0055710 A1 | 3/2005 | Aoki et al. |
| 2005/0091316 A1 | 4/2005 | Ponce et al. |
| 2005/0149880 A1 | 7/2005 | Postrel |
| 2005/0246739 A1 | 11/2005 | Davidson |
| 2005/0251820 A1 | 11/2005 | Stefanik et al. |
| 2005/0262542 A1 | 11/2005 | DeWeese et al. |
| 2005/0278443 A1 | 12/2005 | Winner et al. |
| 2005/0278740 A1 | 12/2005 | Helms |
| 2005/0283813 A1 | 12/2005 | Jamail et al. |
| 2006/0031882 A1 | 2/2006 | Swix et al. |
| 2006/0041927 A1 | 2/2006 | Stark et al. |
| 2006/0059526 A1 | 3/2006 | Poslinski |
| 2006/0075019 A1 | 4/2006 | Donovan et al. |
| 2006/0080408 A1 | 4/2006 | Istvan et al. |
| 2006/0090183 A1 | 4/2006 | Zito et al. |
| 2006/0112325 A1 | 5/2006 | Ducheneaut et al. |
| 2006/0130093 A1 | 6/2006 | Feng et al. |
| 2006/0143236 A1 | 6/2006 | Wu |
| 2006/0161950 A1 | 7/2006 | Imai et al. |
| 2006/0195479 A1 | 8/2006 | Spiegelman et al. |
| 2006/0248557 A1 | 11/2006 | Stark et al. |
| 2006/0253874 A1 | 11/2006 | Stark et al. |
| 2006/0259926 A1 | 11/2006 | Scheelke et al. |
| 2006/0271959 A1 | 11/2006 | Jacoby et al. |
| 2007/0061835 A1 | 3/2007 | Klein et al. |
| 2007/0106627 A1 | 5/2007 | Srivastava et al. |
| 2007/0123353 A1 | 5/2007 | Smith |
| 2007/0124795 A1 | 5/2007 | McKissick et al. |
| 2007/0186180 A1 | 8/2007 | Morgan |
| 2007/0186231 A1 | 8/2007 | Haeuser et al. |
| 2007/0186243 A1 | 8/2007 | Pettit et al. |
| 2007/0198532 A1 | 8/2007 | Krikorian et al. |
| 2007/0220566 A1 | 9/2007 | Ahmad-Taylor |
| 2007/0245367 A1 | 10/2007 | Ogawa |
| 2007/0256103 A1 | 11/2007 | Knudson |
| 2007/0271338 A1 | 11/2007 | Anschutz |
| 2007/0282949 A1 | 12/2007 | Fischer et al. |
| 2007/0294726 A1 | 12/2007 | Drazin |
| 2008/0010153 A1 | 1/2008 | Pugh-O'Connor et al. |
| 2008/0022320 A1 | 1/2008 | Ver Steeg |
| 2008/0040370 A1 | 2/2008 | Bosworth et al. |
| 2008/0052371 A1 | 2/2008 | Partovi et al. |
| 2008/0066111 A1 | 3/2008 | Ellis et al. |
| 2008/0066114 A1 | 3/2008 | Carlson et al. |
| 2008/0082606 A1 | 4/2008 | Gupta et al. |
| 2008/0092168 A1 | 4/2008 | Logan et al. |
| 2008/0098323 A1* | 4/2008 | Vallone et al. ............ 715/772 |
| 2008/0114861 A1 | 5/2008 | Gildred |
| 2008/0126936 A1 | 5/2008 | Williams |
| 2008/0155600 A1 | 6/2008 | Klappert et al. |
| 2008/0163307 A1 | 7/2008 | Coburn et al. |
| 2008/0168506 A1 | 7/2008 | Pickelsimer et al. |
| 2008/0168515 A1 | 7/2008 | Benson et al. |
| 2008/0177727 A1 | 7/2008 | Pickelsimer et al. |
| 2008/0178218 A1 | 7/2008 | Pickelsimer et al. |
| 2008/0235733 A1 | 9/2008 | Heie et al. |
| 2008/0263595 A1 | 10/2008 | Sumiyoshi et al. |
| 2008/0276278 A1 | 11/2008 | Krieger et al. |
| 2008/0288596 A1 | 11/2008 | Smith et al. |
| 2008/0313541 A1 | 12/2008 | Shafton et al. |
| 2008/0320139 A1 | 12/2008 | Fukuda et al. |
| 2009/0019374 A1 | 1/2009 | Logan et al. |
| 2009/0049098 A1 | 2/2009 | Pickelsimer et al. |
| 2009/0049118 A1 | 2/2009 | Stevens |
| 2009/0049473 A1 | 2/2009 | Pickelsimer et al. |
| 2009/0055743 A1 | 2/2009 | Pickelsimer et al. |
| 2009/0063994 A1 | 3/2009 | Pickelsimer et al. |
| 2009/0094643 A1 | 4/2009 | Pickelsimer et al. |
| 2009/0100469 A1 | 4/2009 | Conradt et al. |
| 2009/0125843 A1 | 5/2009 | Billmaier et al. |
| 2009/0172127 A1 | 7/2009 | Srikanth et al. |
| 2009/0172543 A1* | 7/2009 | Cronin et al. ............ 715/721 |
| 2009/0199242 A1 | 8/2009 | Johnson et al. |
| 2009/0307719 A1 | 12/2009 | Clark et al. |
| 2009/0310933 A1* | 12/2009 | Lee ............ 386/68 |
| 2009/0313664 A1 | 12/2009 | Patil et al. |
| 2010/0107194 A1 | 4/2010 | McKissick et al. |
| 2010/0175084 A1 | 7/2010 | Ellis et al. |
| 2011/0010744 A1 | 1/2011 | Stecyk et al. |
| 2011/0013885 A1 | 1/2011 | Wong et al. |
| 2011/0072455 A1 | 3/2011 | Pickelsimer et al. |
| 2011/0090402 A1 | 4/2011 | Huntington et al. |
| 2011/0138423 A1 | 6/2011 | Pickelsimer et al. |
| 2011/0202945 A1 | 8/2011 | Pickelsimer et al. |
| 2011/0283313 A1 | 11/2011 | Gathen et al. |
| 2012/0054808 A1 | 3/2012 | Nijim |
| 2012/0054810 A1 | 3/2012 | Nijim |
| 2012/0222056 A1 | 8/2012 | Donoghue et al. |
| 2012/0284744 A1 | 11/2012 | Kumar |

OTHER PUBLICATIONS

U.S. Office Action dated Dec. 28, 2011 cited in U.S. Appl. No. 12/545,099, 13 pgs.

U.S. Office Action dated Jan. 5, 2012 cited in U.S. Appl. No. 12/126,096, 20 pgs.

Copending U.S. Appl. No. 12/959,731, filed Dec. 3, 2010 entitled "Providing a Media Guide Including Parental Information".

Copending U.S. Appl. No. 12/959,665, filed Dec. 3, 2010 entitled "Content Recommendations".

Copending U.S. Appl. No. 12/959,793, filed Dec. 3, 2010 entitled "Personalizing TV Content".

U.S. Final Office Action dated Jan. 14, 2011 cited in U.S. Appl. No. 12/126,096.

U.S. Office Action dated Jan. 18, 2012 cited in U.S. Appl. No. 12/126,025, 27 pgs.

U.S. Office Action dated Jan. 19, 2012 cited in U.S. Appl. No. 12/126,165, 20 pgs.

U.S. Office Action dated Jan. 19, 2012 cited in U.S. Appl. No. 11/651,140, 21 pgs.

U.S. Office Action dated Feb. 14, 2011 cited in U.S. Appl. No. 12/126,025.

U.S. Office Action dated Feb. 17, 2011 cited in U.S. Appl. No. 12/126,060.

U.S. Office Action dated Feb. 18, 2011 cited in U.S. Appl. No. 12/545,099.

U.S. Office Action dated Feb. 28, 2011 cited in U.S. Appl. No. 11/651,140.

U.S. Final Office Action dated Mar. 2, 2011 cited in U.S. Appl. No. 11/787,732.

U.S. Final Office Action dated Mar. 2, 2011 cited in U.S. Appl. No. 12/126,165.

U.S. Office Action dated Mar. 26, 2012 cited in U.S. Appl. No. 12/126,060, 26 pgs.

U.S. Office Action dated Apr. 26, 2011 cited in U.S. Appl. No. 12/126,096.
U.S. Final Office Action dated Aug. 5, 2011 cited in U.S. Appl. No. 12/545,099.
U.S. Final Office Action dated Sep. 27, 2011 cited in U.S. Appl. No. 11/651,140.
U.S. Office Action dated Sep. 30, 2010 cited in U.S. Appl. No. 12/126,165.
U.S. Office Action dated Oct. 5, 2010 cited in U.S. Appl. No. 12/126,096.
U.S. Appl. No. 13/221,151, filed Aug. 30, 2011 entitled "Sharing Digitally Recorded Content".
U.S. Final Office Action dated Sep. 29, 2011 cited in U.S. Appl. No. 12/126,096.
Copending U.S. Appl. No. 12/868,801, filed Aug. 26, 2010 entitled "Content Library".
Copending U.S. Appl. No. 12/868,824, filed Aug. 26, 2010 entitled "Playlist Bookmarking".
J. Bouwen et al., "Community Meets Entertainment: Community Television," Technology White Paper, Alcatel Telecommunications Review, 1st Quarter 2005, pp. 1-8, http://www.alcatel.com/doctypes/articlespaperlibrary/pdf/ATR2005QI/T0503-Community_TV-EN.pdf.
U.S. Office Action dated Apr. 28, 2009 cited in U.S. Appl. No. 11/787,733.
U.S. Office Action dated Jun. 22, 2009 cited in U.S. Appl. No. 11/787,732.
U.S. Final Office Action dated Dec. 30, 2009 cited in U.S. Appl. No. 11/787,732.
U.S. Office Action dated Sep. 14, 2010 cited in U.S. Appl. No. 11/651,140.
U.S. Office Action dated Sep. 14, 2010 cited in U.S. Appl. No. 11/787,732.
U.S. Office Action dated Jun. 7, 2011 cited in U.S. Appl. No. 11/651,140.
U.S. Final Office Action dated Jun. 13, 2011 cited in U.S. Appl. No. 12/126,060.
U.S. Final Office Action dated Jun. 21, 2011 cited in U.S. Appl. No. 12/126,025.
U.S. Final Office Action dated Apr. 20, 2012 cited in U.S. Appl. No. 12/126,096, 25 pgs.
U.S. Final Office Action dated Apr. 25, 2012 cited in U.S. Appl. No. 12/545,099, 16 pgs.
U.S. Final Office Action dated Apr. 25, 2012 cited in U.S. Appl. No. 11/651,140, 21 pgs.
U.S. Final Office Action dated May 31, 2012 cited in U.S. Appl. No. 12/126,165, 23 pgs.
U.S. Office Action dated Jun. 5, 2012 cited in U.S. Appl. No. 12/126,126, 40 pgs.
U.S. Office Action dated Jun. 20, 2012 cited in U.S. Appl. No. 12/959,731, 30 pgs.
U.S. Final Office Action dated Aug. 15, 2012 cited in U.S. Appl. No. 12/126,025, 33 pgs.
U.S. Final Office Action dated Aug. 23, 2012 cited in U.S. Appl. No. 12/126,060, 30 pgs.
U.S. Office Action dated Sep. 13, 2012 cited in U.S. Appl. No. 11/651,140, 23 pgs.
U.S. Office Action dated Oct. 4, 2012 cited in U.S. Appl. No. 12/868,801, 27 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Nov. 29, 2012 cited in U.S. Appl. No. 12/868,824, 33 pgs.

* cited by examiner

CONTENT BOOKMARKING

BACKGROUND

A conventional "bookmark" may comprise anything slipped between the pages of a book to mark a place. With respect to the Internet, a bookmark may comprise a digital pointer that a user can create for gaining easy access to a Web page. An Internet bookmark may be a locally stored Uniform Resource Identifier (URI). Modern web browsers may include bookmark features that may be referred to as favorites or Internet shortcuts. Bookmarks maybe accessed through a menu in the user's web browser, and folders are commonly used for organization.

SUMMARY

Bookmarking may be provided. Content bookmarking may be provided. First, a content program may be displayed and a user initiated input may be received. Next, in response to the user initiated input, a currently displayed point in the content program may be jumped from to a time stamped point in the content program. The content program may then be displayed from the time stamped point.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
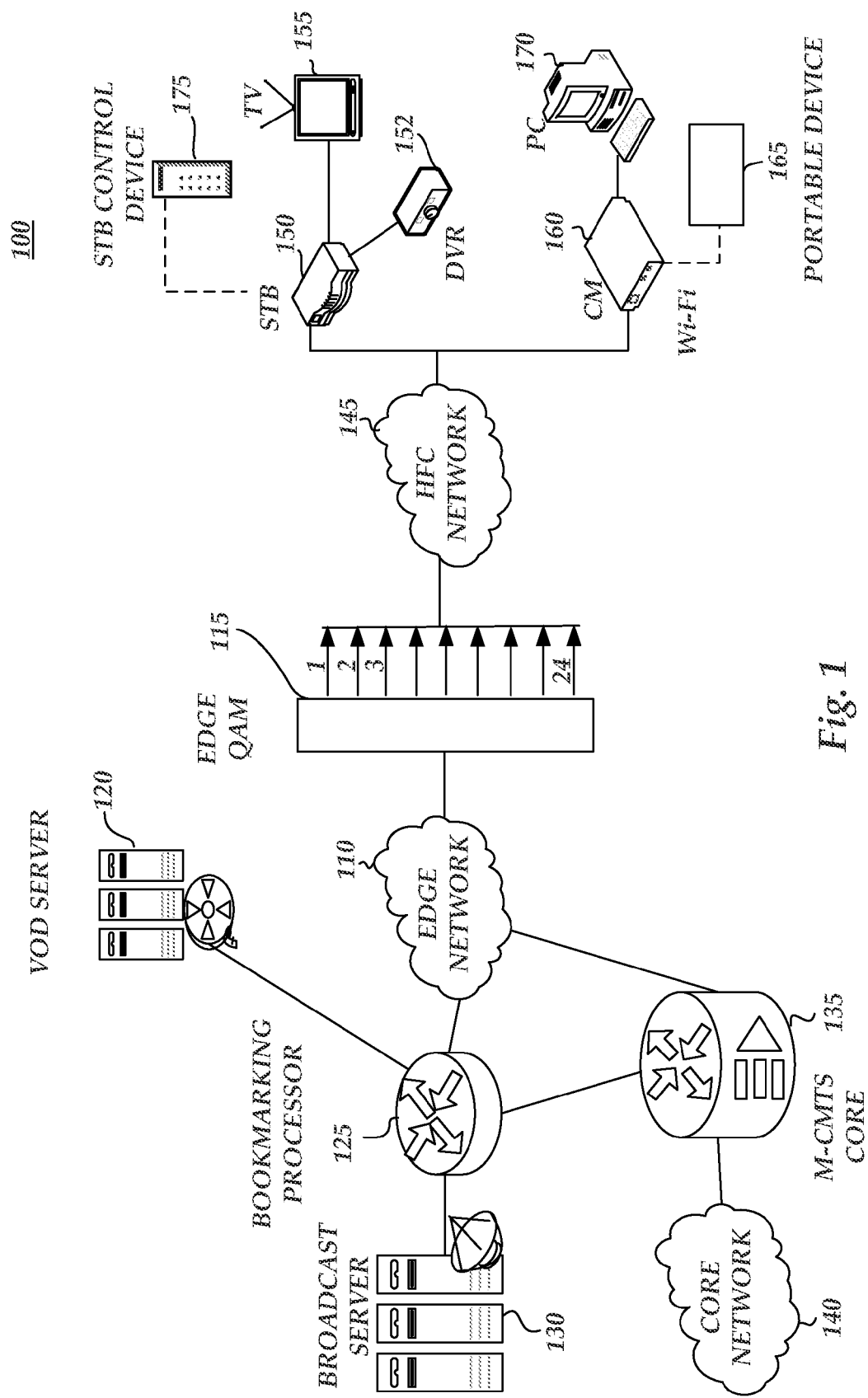
FIG. 1 is a block diagram of an operating environment including a bookmarking processor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content programs to users (e.g. customers) over a content delivery system. Different types of content programs may be delivered, for example, over a plurality of content channels (e.g. linear TV) or via video on demand (VOD) that a user may select among using a user device, for example, a set-top box (STB), a personal computer (PC), or a mobile device. Regardless of the content program types, the users may rent, purchase, or record content program. These content programs may be saved on, but not limited to, a digital video recorder (DVR), the STB, the PC, or the mobile device. The users may play back and view the saved content programs.

When playing back saved programs, the user may use mode keys (i.e. play, fast forward, rewind, pause, and stop) to proceed and view through the content programs. If a user wants to watch the middle of a program, with conventional systems, the user has to use the "fast forward" button, pressing it several times to change the fast forward speed.

Consistent with embodiments of the invention, the user may be able to move more quickly through content programs by using bookmarks (e.g. time stamps) placed within the content programs. For example, if a user wants to access the middle of a content program, the user may press a button (e.g. "1") that may take the user to the middle of the content program. Then, if the user presses "1" again, the user may then be taken to the end of the content program. The time stamps within the content program may be programmable and configurable per content program by the user, for example. This may allow the user to use pre-defined locations (e.g. points) within the content program to fast forward or rewind.

Consistent with embodiments of the invention, locations (e.g. points) within the content program may be time stamped. Then, when the user presses a key (or key sequence), the user may jump to corresponding locations in the content program. For example, the number "1" key may be defined to jump through the content program to the 10 minute location, the number "2" key may be defined to jump through the content program to the 20 minute location, and the number "3" key may be defined to jump through the content program to the 30 minute location. Then, when the user is before the 10 minute location in the content program and the user presses the fast forward key followed by the number "1" key, the user may jump forward to the 10 minute location in the content program. Similarly, when the user is before the 20 minute location in the content program and the user presses the fast forward key followed by the number "2" key, the user may jump forward to the 20 minute location in the content program. Also, when the user is before the 30 minute location in the content program and the user presses the fast forward key followed by the number "3" key, the user may jump forward to the 30 minute location in the content program. This may provide a quicker user experience and may save more on the battery life especially for a mobile device.

Similarly, when the user is past the 10 minute location in the content program and the user presses the rewind key followed by the number "1" key, the user may jump backward to the 10 minute location in the content program. Similarly, when the user is past the 20 minute location in the content program and the user presses the rewind key followed by the number "2" key, the user may jump backward to the 20 minute location in the content program. Also, when the user is after the 30 minute location in the content program and the user presses the rewind key followed by the number "3" key, the user may jump backward to the 30 minute location in the content program. This may provide a quicker user experience and may save more on the battery life especially for a mobile device.

Consistent with embodiments of the invention, locations within the content program may be time stamped relative to the length of the content program. For example, the number "1" key may be defined to jump through the content program to the $\frac{1}{10}$ of the program length location, the number "2" key may be defined to jump through the content program to the 2/10 of the program length location, and the number "3" key may be defined to jump through the content program to the 3/10 of the program length location. Then, when the user is before the 1/10 of the program length location in the content program and the user presses the fast forward key followed by the number "1" key, the user may jump forward to the 1/10 of the program length location in the content program. Similarly, when the user is before the 2/10 of the program length location in the content program and the user presses the fast forward key followed by the number "2" key, the user may jump forward to the 2/10 of the program length location in the content program. Also, when the user is before the 3/10 of the program length mark location in the content program and the user presses the fast forward key followed by the number "3" key, the user may jump forward to the 3/10 of the program length location in the content program. This may provide a quicker user experience and may save more on the battery life especially for a mobile device.

Similarly, when the user is after the 1/10 of the program length mark location in the content program and the user presses the rewind key followed by the number "1" key, the user may jump backward to the 1/10 of the program length in the content program. Similarly, when the user is after the 2/10 of the program length location in the content program and the user presses the rewind key followed by the number "2" key, the user may jump backward to the 2/10 of the program length location in the content program. Also, when the user is after the 3/10 of the program length location in the content program and the user presses the rewind key followed by the number "3" key, the user may jump backward to the 3/10 of the program length location in the content program. This may provide a quicker user experience and may save more on the battery life especially for a mobile device.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a list processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a digital video recorder (DVR) 152, a television (TV) 155, a cable modem (CM) 160, a portable device 165, a personal computer (PC) 170, and a STB control device 175. List processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, list processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

DVR 152 may be used in conjunction with STB 150. DVR 152 may record video in a digital format to a disk drive, USB flash drive, memory card, or other memory medium within DVR 152.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, mobile telephone, mobile device, notebook computer, and home computing device. Portable device 165 or PC 170 may serve as user devices for data access from system 100. Portable device 165 and PC 170 may transmit and receive data and services from system 100. Portable device 165 or PC 170 may record video in a digital format to a disk drive, USB flash drive, memory card, or other memory medium within portable device 165 or PC 170.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing content bookmarking. The system may comprise a memory storage and a processing unit coupled to the memory storage. The processing unit may be operative to display a content program and receive a user initiated input. In addition, the processing unit may be operative to jump, in response to the user initiated input, from a currently displayed point in the content program to a time stamped point in the content program. Furthermore, the processing unit may be operative to display the content from the time stamped point.

Consistent with embodiments of the present invention, the aforementioned memories, processing units, and other components may be implemented in a content delivery system, such as system 100 of FIG. 1. Any suitable combination of hardware, software, and/or firmware may be used to implement the memories, processing units, or other components. By way of example, the memories, processing units, or other components may be implemented with bookmarking processor 125 or user devices such, but not limited to, STB 150, DVR 152, TV 155, CM 160, PC 170, and portable device 165, in combination with system 100. The aforementioned system and processors are examples and other systems and processors may comprise the aforementioned memories, processing units, or other components, consistent with embodiments of the present invention.

Figure 2:
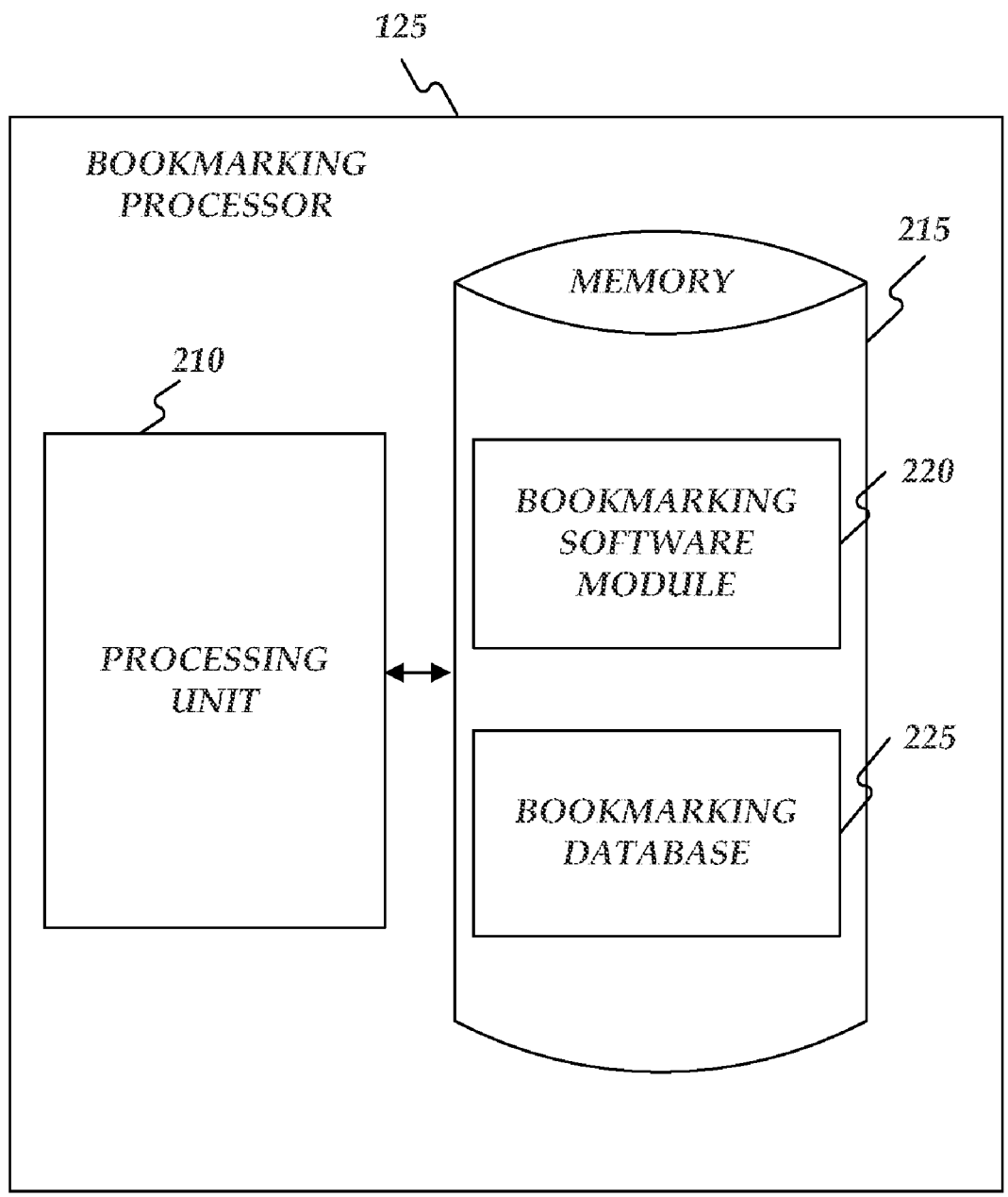
FIG. 2 is a block diagram of the bookmarking processor.

FIG. 2 shows bookmarking processor 125 of FIG. 1 in more detail. As shown in FIG. 2, bookmarking processor 125 may include a processing unit 210 and a memory unit 215. Memory 215 may include a bookmarking software module 220 and a bookmarking database 225. While executing on processing unit 210, bookmarking software module 220 may perform processes for providing content bookmarking, in conjunction with, for example, one or more stages included in method 300 described below with respect to FIG. 3. Furthermore, bookmarking software module 220 and bookmarking database 225 may be executed on or reside in any element shown in FIG. 1. Moreover, any one or more of the stages included in method 300 may be performed on any element shown in FIG. 1 including, but not limited to, STB 150, DVR 152, TV 155, CM 160, PC 170, or portable device 165. Set-top-box (STB) 150, DVR 152, and television (TV) 155 may function together as one user device.

Bookmarking processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
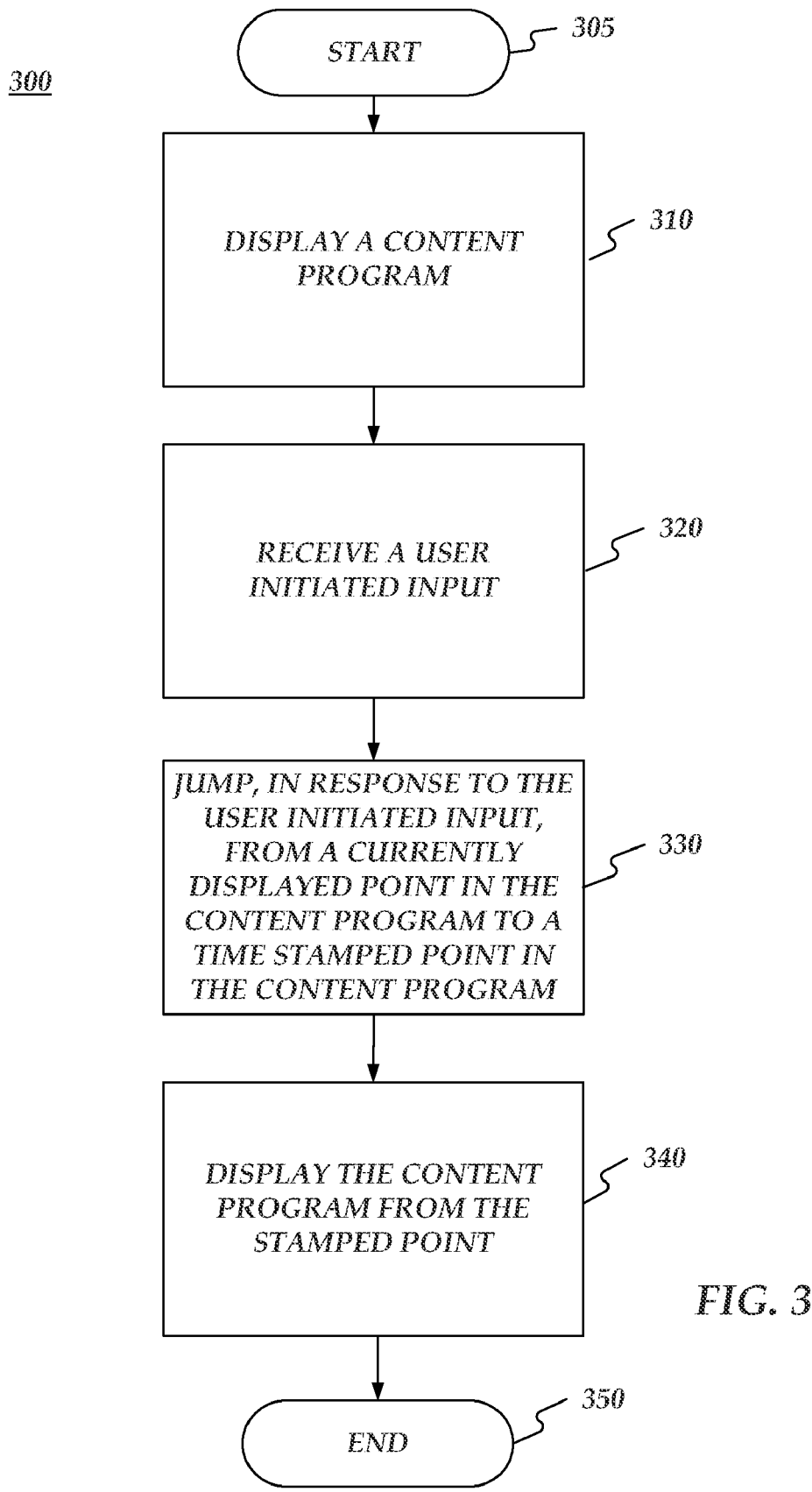
FIG. 3 is a flow chart of a method for providing content bookmarking.

FIG. 3 is a flow chart setting forth the general stages involved in a method 300 consistent with an embodiment of the invention for providing content bookmarking. Method 300 may be implemented using, for example, DVR 152 as described in more detail above with respect to FIG. 1. Embodiments of the invention may be implemented using devices other than and in addition to DVR 152 including, but not limited to, STB 150, CM 160, portable device 165, PC 170, bookmarking processor 125, or VOD server 120, for example. Ways to implement the stages of method 300 will be described in greater detail below.

Method 300 may begin at starting block 305 and proceed to stage 310 where DVR 152 may display a content program. For example, DVR 152 or STB 150 may display the content program on TV 155. In other embodiments, the content program may be displayed on PC 170 or on portable device 165. The content program may comprise a VOD program received from VOD server 120, or may comprise a rented, purchased program, or linear television show saved on DVR 152, PC 170, or portable device 165.

From stage 310, where DVR 152 displays the content program, method 300 may advance to stage 320 where DVR 152 may receive a user initiated input. For example, the user initiated input may come in response to a user using STB control device 175 to control DVR 152 or STB 150, in response to the user using a keyboard or mouse on PC 170, or in response to the user using a touch pad or keypad on portable device 165.

Once DVR 152 receives the user initiated input in stage 320, method 300 may continue to stage 330 where DVR 152 may jump, in response to the user initiated input, from a currently displayed point in the content program to a time stamped point in the content program. For example, when playing back content programs saved on DVR 152, PC 170, or portable device 165, the user may use mode keys (e.g. fast forward or rewind, on STB control device 175 pause, keys on a keyboard or mouse on PC 170, or in response to the user using a touch pad or keypad on portable device 165) to proceed and view through the content programs. Consistent with embodiments of the invention, the user may be able to move more quickly through content programs by using bookmarks (e.g. time stamps) placed within the content programs. For example, if a user wants to access the middle of a content program, the user may press a key or button (e.g. "1") that may take the user to the middle of the content program. Then, if the user presses "1" again, the user may then be taken to the end of the content program. The time stamps within the content program may be programmable and configurable per content program by the user, for example. This may allow the user to use pre-defined locations (e.g. points) within the content program to fast forward or rewind.

Consistent with embodiments of the invention, jumping from the currently displayed point in the content program to the time stamped point in the content program may comprise jumping to the time stamped point comprising one of a plurality of stamped points being evenly spaced at a predetermined amount of time apart from the beginning of the content program. For example, when the user presses a key (or key sequence), the user may jump to corresponding locations in the content program. For example, the number "1" key may be defined to jump through the content program to the 10 minute location, the number "2" key may be defined to jump through the content program to the 20 minute location, and the number "3" key may be defined to jump through the content program to the 30 minute location. Then, when the user is before the 10 minute location in the content program and the user presses the fast forward key followed by the number "1" key, the user may jump forward to the 10 minute location in the content program. Similarly, when the user is before the 20 minute location in the content program and the user presses the fast forward key followed by the number "2" key, the user may jump forward to the 20 minute location in the content program. Also, when the user is before the 30 minute location in the content program and the user presses the fast forward key followed by the number "3" key, the user may jump forward to the 30 minute location in the content program.

Similarly, when the user is past the 10 minute location in the content program and the user presses the rewind key followed by the number "1" key, the user may jump backward to the 10 minute location in the content program. Similarly, when the user is past the 20 minute location in the content program and the user presses the rewind key followed by the number "2" key, the user may jump backward to the 20 minute location in the content program. Also, when the user is after the 30 minute location in the content program and the user presses the rewind key followed by the number "3" key, the user may jump backward to the 30 minute location in the content program.

Furthermore, movement in the content program may be relevant to the current position in the content program. For example, the number "1" key may be defined for a 10 minute jump, the number "2" key may be defined for a 20 minute jump, and the number "3" key may be defined for a 30 minute jump. Then, when the user presses the number "1" key followed by the "fast-forward" key, the user may jump 10 minutes forward from the current position. When the user presses the number "1" key followed by the "fast-forward" key again, the user may jump forward another 10 minutes from the current position. Similarly, when the user presses the number "2" key followed by the "fast-forward" key, the user may jump 20 minutes forward from the current position. When the user presses the number "2" key followed by the "fast-forward" key again, the user may jump forward another 20 minutes from the current position. If the "rewind" key is used rather than the "fast-forward" key, the jumps may be backward rather than forward.

Consistent with embodiments of the invention, jumping from the currently displayed point in the content program to the time stamped point in the content program may comprise jumping to the time stamped point comprising one of a plurality of stamped points being evenly spaced at a predetermined percentage of the content program's total time apart. For example, locations within the content program may be time stamped relative to the length of the content program. For example, the number "1" key may be defined to jump through the content program to the $1/10$ of the program length location, the number "2" key may be defined to jump through the content program to the $2/10$ of the program length location, and the number "3" key may be defined to jump through the content program to the $3/10$ of the program length location. Then, when the user is before the $1/10$ of the program length location in the content program and the user presses the fast forward key followed by the number "1" key, the user may jump forward to the $1/10$ of the program length location in the content program. Similarly, when the user is before the $2/10$ of the program length location in the content program and the user presses the fast forward key followed by the number "2" key, the user may jump forward to the $2/10$ of the program length location in the content program. Also, when the user is before the $3/10$ of the program length mark location in the content program and the user presses the fast forward key followed by the number "3" key, the user may jump forward to the $3/10$ of the program length location in the content program.

Similarly, when the user is after the $1/10$ of the program length mark location in the content program and the user presses the rewind key followed by the number "1" key, the user may jump backward to the $1/10$ of the program length in the content program. Similarly, when the user is after the $2/10$ of the program length location in the content program and the user presses the rewind key followed by the number "2" key, the user may jump backward to the $2/10$ of the program length location in the content program. Also, when the user is after the $3/10$ of the program length location in the content program and the user presses the rewind key followed by the number "3" key, the user may jump backward to the $3/10$ of the program length location in the content program.

After DVR 152 jumps from the currently displayed point in the content program to the time stamped point in the content program in stage 330, method 300 may proceed to stage 340 where DVR 152 display the content program from the time stamped point. For example, DVR 152 or STB 150 may display the content program on TV 155 from the time stamped point. The content program may be displayed from the time stamped point forward or backward depending upon the user initiated input. In other embodiments, the content program may be displayed on PC 170 or on portable device 165. Once DVR 152 displays the content program from the time stamped point in stage 340, method 300 may then end at stage 350.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing content bookmarking, the method comprising:
   displaying a content program;
   receiving a user initiated input; the user initiate input indicating an interval of time to jump within the content program;
   jumping, in response to the user initiated input, from a currently displayed point in the content program to a time stamped point in the content program; and
   displaying the content program from the time stamped point.

2. The method of claim 1, wherein receiving the user initiated input comprises receiving the user initiated input corresponding to the time stamped point.

3. The method of claim 1, wherein receiving the user initiated input comprises receiving the user initiated input corresponding to the time stamped point and indicating a jump forward in the content program.

4. The method of claim 1, wherein receiving the user initiated input comprises receiving the user initiated input corresponding to the time stamped point and indicating a jump backward in the content program.

5. The method of claim 1, wherein jumping from the currently displayed point in the content program to the time stamped point in the content program comprises jumping forward in the content program.

6. The method of claim 1, wherein jumping from the currently displayed point in the content program to the time stamped point in the content program comprises jumping backward in the content program.

7. The method of claim 1, wherein jumping from the currently displayed point in the content program to the time stamped point in the content program comprises jumping to the time stamped point comprising one of a plurality of stamped points being evenly spaced at a predetermined amount of time apart from the beginning of the content program.

8. The method of claim 1, wherein jumping from the currently displayed point in the content program to the time stamped point in the content program comprises jumping to the time stamped point comprising one of a plurality of stamped points being evenly spaced at a predetermined percentage of the content program's total time apart.

9. The method of claim 1, wherein displaying the content program from the time stamped point comprises displaying the content program on a portable device.

10. The method of claim 1, wherein displaying the content program from the time stamped point comprises displaying the content program on a television (TV) from a digital video recorder (DVR).

11. The method of claim 1, wherein displaying the content program from the time stamped point comprises displaying the content program on a computer display from a computer.

12. The method of claim 1, wherein displaying the content program from the time stamped point comprises displaying the content program comprising one of the following: a video on demand program, a purchased program saved to a digital video recorder (DVR), a rented program saved to the DVR, and a purchased program stored on a network.

13. The method of claim 1, further comprising placing the time stamp in the content program in response to a user command.

14. A computer-readable storage device that stores a set of instructions which when executed perform a method for providing content bookmarking, the method executed by the set of instructions comprising:
- displaying a content program;
- receiving a user initiated input; the user input indicating that the content program be played back at a point that is one of the following: a preset amount of time before a currently displayed point in the content program and the present amount of time ahead of the currently displayed point in the content program, the present amount of time;
- jumping, in response to the user initiated input, from a currently displayed point in the content program to a time stamped point in the content program, wherein jumping from the currently displayed point in the content program to the time stamped point in the content program comprises jumping to the time stamped point comprising one of a plurality of stamped points being evenly spaced at a predetermined percentage of the content program's total time apart; and
- displaying the content program from the time stamped point.

15. The computer-readable storage device of claim 14, wherein receiving the user initiated input comprises receiving the user initiated input corresponding to the time stamped point.

16. The computer-readable storage device of claim 14, wherein receiving the user initiated input comprises receiving the user initiated input corresponding to the time stamped point and indicating a jump forward in the content program.

17. The computer-readable storage device of claim 14, wherein receiving the user initiated input comprises receiving the user initiated input corresponding to the time stamped point and indicating a jump backward in the content program.

18. The computer-readable storage device of claim 14, wherein jumping from the currently displayed point in the content program to the time stamped point in the content program comprises jumping forward in the content program.

19. The computer-readable storage device of claim 14, wherein jumping from the currently displayed point in the content program to the time stamped point in the content program comprises jumping backward in the content program.

20. A system for providing content bookmarking, the system comprising:
- a memory storage; and
- a processing unit coupled to the memory storage, wherein the processing unit is operative to;
  - display a content program;
  - receive a user initiated input; the user initiated input indicating that the content program be played back at a point that is one of the following: a preset amount of time before a currently displayed point in the content program and the present amount of time ahead of the currently displayed point in the content
  - jump, in response to the user initiated input, from a currently displayed point in the content program to a time stamped point in the content program, wherein the processing unit is being operative to jump from the currently displayed point in the content program to the time stamped point in the content program comprises the processing unit is being operative to jump to the time stamped point comprising one of a plurality of stamped points being evenly spaced at a predetermined amount of time apart from the beginning of the content program; and
  - display the content program from the time stamped point.

* * * * *

UNITED STATES PATENT AND TRADEMARK OFFICE
CERTIFICATE OF CORRECTION

PATENT NO.       : 8,364,013 B2  
APPLICATION NO.  : 12/868838  
DATED            : January 29, 2013  
INVENTOR(S)      : Yousef Wasef Nijim Page 1 of 1

It is certified that error appears in the above-identified patent and that said Letters Patent is hereby corrected as shown below:

IN THE CLAIMS:

Column 10, line 28, claim 1, "receiving a user initiated input; the user initiate input" should read --receiving a user initiated input, the user initiated input--;

Column 11, line 25, claim 14, "receiving a user initiated input; the user input" should read --receiving a user initiated input, the user initiated input--;

Column 11, line 29, claim 14, "the present amount of time" should read --the present amount of time being determined by the user initiated input--;

Column 12, line 24, claim 20, "receive a user initiated input;" should read --receive a user initiated input,--;

Column 12, line 29, claim 20, "currently displayed point in the content" should read --currently displayed point in the content program, the present amount of time being determined by the user initiated input;--; and Column 12, line 30, claim 20, "from a" should read --from the--.

Signed and Sealed this  
Ninth Day of June, 2015

Michelle K. Lee  
*Director of the United States Patent and Trademark Office*